United States Patent [19]

Schatz

[11] Patent Number: 5,765,511

[45] Date of Patent: Jun. 16, 1998

[54] METHOD AND SWITCHING ARRANGEMENT FOR OPERATING HEAT ACCUMULATORS, IN PARTICULAR FOR SENSIBLE HEAT

[75] Inventor: Oskar Schatz, Gauting, Germany

[73] Assignee: Schatz Thermo System GmbH, Erling Andechs, Germany

[21] Appl. No.: 750,510

[22] PCT Filed: Oct. 27, 1995

[86] PCT No.: PCT/EP95/04220

§ 371 Date: Dec. 3, 1996

§ 102(e) Date: Dec. 3, 1996

[87] PCT Pub. No.: WO96/31694

PCT Pub. Date: Oct. 10, 1996

[30] Foreign Application Priority Data

Apr. 5, 1995 [DE] Germany ............ 195 12 821.4
Sep. 19, 1995 [DE] Germany ............ 195 35 027.8

[51] Int. Cl.[6] ............................................. F01P 11/02
[52] U.S. Cl. ............... 123/41.14; 165/51; 237/12.3 B
[58] Field of Search ................... 123/41.14; 165/10, 165/41, 51; 237/12.3 B

[56] References Cited

U.S. PATENT DOCUMENTS 3,498,539  3/1970  Boehmfeld et al. .......... 123/41.14
3,523,644  8/1970  Kozinski .................... 123/41.14

FOREIGN PATENT DOCUMENTS

A 0 542 189  5/1993  European Pat. Off. .
A 0 593 928  4/1994  European Pat. Off. .
3212043     10/1983  Germany ................. 123/41.14
A 38 24 099  1/1990  Germany .
A 06-173679  6/1994  Japan .

*Primary Examiner*—Noah P. Kamen
*Attorney, Agent, or Firm*—Harness, Dickey & Pierce, PLC

[57]  ABSTRACT

In the operation of heat storage devices in particular for reusable heat in automotive vehicles, and in particular for heating the engine at cold start, a coolant circulates in a cooling fluid circuit extending through the engine, with the coolant flowing between a heat source and/or a heat consumer and an heat storage device being used as the storage medium. At cold start, circulation of the coolant in the cooling fluid circuit occurs via the heat storage device and such circulation is terminated as soon as the temperatures of the coolant at the inlet and the outlet of the heat storage device have approximated each other to a predetermined value.

10 Claims, 3 Drawing Sheets

METHOD AND SWITCHING ARRANGEMENT FOR OPERATING HEAT ACCUMULATORS, IN PARTICULAR FOR SENSIBLE HEAT

FIELD OF THE INVENTION

The present invention relates to a method for operating heat storage devices for providing reusable heat in automotive vehicles. More particularly, the present invention relates to a method for operating heat storage devices for heating the engine at cold start, wherein coolant circulates in a cooling circuit extending through the engine. The coolant is located between a heat source and/or a heat consumer and a heat storage device being used as the storage medium. In addition, the present invention relates to a coolant circuit assembly and a heat storage device for performing the method.

BACKGROUND OF THE INVENTION

Heat storage devices for the heating of automotive vehicles at cold start, both for heating the engine and the passenger compartment are well known in the art. The prior art literature describes both heat storage devices which store thermal energy by means of a latent heat storage device using transformation thermal energy, as well as storage devices for reusable thermal energy with circulating coolants.

A general problem when using heat storage devices in automotive vehicles is the space requirement. This is particularly true in modern vehicles where space for the technical equipment has become minimal. In this respect latent heat storage devices are advantageous because they allow for an increased thermal energy density. Furthermore they transfer their heat somewhat more slowly so that they are better suited for the heating of vehicle passenger compartments than for the heating of engines.

Heat storage devices for reusable heat transfer their thermal energy within 30 to 40 seconds and therefore are particularly suited of the heating of vehicle engines in order to reduce exhaust emissions. The passenger compartment heating will not be significantly affected by these devices. On the other hand, the cost of heat storage devices for reusable heat is more favorable. The same is true with respect to their reliability in operation. For example, the coolants for latent heat storage devices are aggressive with respect to some metals present in the cooling circuit of an engine; others are detrimental from an environmental standpoint and are dangerous in the case of accidents.

Therefore it is the object of the present invention to improve applicability of heat storage devices for reusable heat, in particular by economical use of the stored exhaust heat provided by engine operation.

In operation of a heat storage device for reusable heat, in particular for heating the engine, the volume of the heat storage device is directly dependent on the total amount of heat to be stored. This includes both the required usable heat and the heat losses occurring in operation. With reference to the desired function, for example to reduce the exhaust gas emissions, the usable heat to be transferred is dependent on the heat active masses in the engine and in the engine circuit, on the rate of the obtainable heat flow, and on the unloading of this heat flow with respect to engine start.

The heat losses which play a substantial role in the operation of the heat storage device for reusable heat depend on three factors:

quality and volume of the insulation;
input and output losses in the storage device;
input and output losses in the engine.

Except for the insulation, all cited parameters for minimizing the required usable heat and minimizing the heat losses can be influenced by the selection of the way the vehicle is operated, by the circuit assembly of the coolant circuit, and by the structure of the heat storage device. In particular, minimization of the required heat and minimizing of the heat loss can be influenced by optimizing or "tuning" these three system components. This includes optimizing the efficiency of the heat transfer for heating the engine at cold start such that when the storage device is unloaded the heat is transferred to the engine as early as possible. Also, when the heat is transferred from the engine to the cooling fluid stored in or removed from the storage device.

SUMMARY OF THE INVENTION

The solution to the above cited object consists of a method wherein, at cold start circulation of the coolant in the cooling fluid circuit, the heat storage and the circulation is terminated as soon as the temperatures of the coolant at the inlet and the outlet of the heat storage device have reached a predetermined value. A particularly advantageous further development of the present invention is in a system wherein the coolant is adapted to circulate independently of engine operation and that circulation of the coolant via the heat storage device begins when the engine is started. The circulation via the heat storage device is resumed when the ignition of the engine is switched off and such circulation will be terminated again as soon as the temperatures of the coolant at the inlet and outlet of the heat storage device have reached a predetermined value.

As a result of this process the heat storage device transfers the stored heat to the circuit extending through the engine for rapidly heating the engine at cold start within the above mentioned 30 to 40 seconds. After switching off the ignition, the heat of the engine may be used for raising the storage device temperature, with the circulation through the storage device being interrupted whenever the optimal heat emission and, respectively, heat absorption have been reached.

By economical use of the engine's exhaust heat, the space requirement of the storage device can be reduced and its ability for heating the passenger compartment may be maintained at a sufficient level to provide the passenger compartment with a sufficiently comfortably heated air flow.

According to a not yet published proposal, fluid circulation through the storage device when the engine has been started or, respectively, when the ignition has been switched off will be interrupted when the contents of the storage device has been completely exchanged. This control of fluid circulation, which is dependent on the volume, is not particularly suited for optimizing heat usage and respectively, storage because the speed of the pump providing fluid circulation varies in response to the temperature and a certain mixing of the cold and hot coolants cannot be avoided.

A reliable indication that the heat exchange occurs at optimal efficiency is when the same temperature prevails at the inlet and the outlet of the heat storage device. As soon as this condition is reached, an effective heat transfer between the storage device and the system is no longer possible. Fluid circulation through the heat storage device at engine start and, if desired, after switching off the ignition will be interrupted so that the available heat may be used in an optimal manner.

An advantageous development is that circulation of the coolant via the heat storage is initiated automatically when the driver's door is opened. In this manner the engine and the heat exchanger will be automatically preheated before the ignition is switched on and the engine started.

Preferably, circulation of the coolant via the heat storage device is resumed when the temperature of the engine or of the coolant circulating in the engine has reached a first predetermine threshold value. This will ensure that the heat storage device contains hot coolant and the storage contents will remain heated so that heat from the storage device will be available when there is a respective demand. In this connection, the threshold temperature is about 5° to 10° C. below the temperature of the thermostat setting of the engine cooling system.

During cold start, the hot coolant is transferred from the storage device into the cooling circuit system and is replaced by a cold coolant which in winter may be at a temperature of $-25°$ C. for example. The rapid and complete discharge of the storage device contents into the system cooling circuit would be unfavorable and would result in a substantial drop of the temperature of the heating air. Accordingly, a further advantageous development of the present invention provides that the ratio of the rate of coolant flow through the heat storage device and the rate of coolant flow bypassing the heat storage device is controlled in response to the temperature of the cooling circuit system upstream of the location where the storage device inlet is branched off. Thus, the rate of flow through the heat storage device increases in response to an increase of the temperature. A further advantageous development provides that the average mixing temperature downstream of the location where the storage device outlet enters the cooling circuit system, as measured for a predetermined time period, is taken into consideration such that the mixing temperature does not fall below a predetermined threshold value.

The mixing ratio of the storage device contents and the system cooling circuit contents may be controlled by a cycled control. As an alternative it may be controlled by a throttling control.

Preferably the second threshold value is at least as high as the first threshold value.

An advantageous development provides that his mixing temperature is controlled by the adjusted heat demand of the heat exchanger.

Another very advantageous solution is a method for operating a heat storage device for reusable heat, wherein the coolant flows through the heat storage device in the same direction during loading and unloading thereof. The coolant during loading enters the heat storage device at a location as low as possible and leaves the storage device at a location as high as possible. As a result there will be, at cold start, minimal mixing of the inflowing cold coolant and the outgoing hot coolant in the storage device. The mixing of cold and hot coolant can be restricted further if, according to a further advantageous development, the coolant when flowing through the heat storage device between the inlet and outlet flows through at least one substantially horizontal screen or is guided in one of more meander-shaped passages. These passages can be in any direction in space, i.e. horizontally, vertically or in any position therebetween.

A further alternative is that the flow direction during loading of the heat storage device is set to be opposite to the flow direction during unloading thereof. The fluid flow bypasses the heat storage device at times other than the loading and unloading. In this manner the shortest path for transporting the hot coolant can be chosen during loading and unloading of the storage device, whereby heat losses are reduced.

For performing the method a cooling circuit assembly includes an internal combustion engine, a cooling fluid circuit extending across the engine and a heat storage device in particular for reusable heat. The heat storage device is disposed in a bypass connected in parallel to the cooling fluid circuit and is adapted to be selectively operated. A first temperature sensor is disposed upstream of the heat storage device and a second temperature sensor is disposed downstream of the heat storage device in the cooling fluid circuit. A comparator circuit is connected to the first and second temperature sensors and is adapted to close the bypass and thereafter to deactivate itself as soon as the values measured by the first and second temperature sensors have reached a predetermine value. The comparator circuit is activated by a control pulse initiated after a predetermined delay period when the system is being actuated. Preferably at least one temperature sensor is positioned externally of the bypass and the conduit portion of the cooling fluid circuit which is bypassed thereby.

A preferred embodiment consists in that a first temperature sensor is positioned upstream of the location where the bypass is branched off, and a second temperature sensor is positioned downstream of the location where the bypass enters the cooling fluid circuit.

According to another particularly preferred embodiment, a control pulse is initiated prior to the time when the engine is started. The control pulse causes the cooling fluid circuit to extend through the heat storage device and actuates the independent pump and the comparator circuit.

A further advantageous development provides that a control pulse is initiated prior to the time when the engine is started. The control pulse causes the cooling fluid circuit to extend through the heat storage device and actuates the independent pump and the comparator circuit. Preferably a control pulse is initiated by the door-lock of the driver's door being opened before the engine is started.

In a circuit assembly, including a heat exchanger provided in the cooling fluid circuit, the bypass including the heat storage device may be disposed between the engine and the heat exchanger or between the heat exchanger and the engine, depending on whether it is the heat exchanger or the engine which is to be provided with stored heat at the start.

An advantageous development provides that at least one valve is disposed in the cooling fluid circuit for bypassing the cooling fluid via the bypass including the heat storage device. For example, a three-way valve may be disposed in the branch to the bypass, or this function may be preformed by a pair of valves. One of the pair of valves is in the bypass while the other is in the conduit bypassing the heat storage device.

A further advantageous arrangement consists of a pump for circulating the coolant through the heat storage device which is disposed in the bypass and a check valve responsive in the direction opposite to the direction of fluid circulation is disposed in the cooling fluid circuit.

A first alternative of the circuit including a switch valve for selectively loading the heat storage device consists of the cooling fluid conduit, in the area of the heat storage between a pair of three-way valves, being divided into a pair of parallel conduit branches which communicate with each other via the heat storage device. The three-way valves have three operative positions associated with each other. The three-way valves communicate directly via one of the conduit branches in the first operative position. The upstream three-way valve communicates with the first conduit branch and the downstream three-way valve communicates with the second conduit branch in the second operative position. The upstream three-way valve communicates with the second three-way valve and the downstream three-way valve communicates with the first conduit branch in the third operative position thereof.

Another advantageous alternative consists in that the cooling fluid conduit in the area of the heat storage device between a pair of junctions is divided into a pair of parallel conduit branches adapted to communicate with the heat storage device each via a three-way valve. The three-way valves have three operative positions associated to each other. The branches communicate directly with each other in the first operative position thereof. A connector of the heat storage device communicates with the upstream branch and the other connector of the heat storage device communicates with the downstream branch in the second operative position thereof. The connector of the heat storage device is connected opposite to the one of the second operative position in the third operative position thereof.

A further advantageous embodiment consists in that an advance line and a return line between the engine and the passenger compartment heating communicate via a short circuit line. Either the advance line or the return line on the engine side of the short circuit line is adapted to be closed in order to provide a heating circuit bypassing the engine. This heating circuit is adapted to communicate with the heat storage device and includes an electrically pump.

With reference to the following description of the embodiments of the invention shown in the drawings, the invention will be explained in more detail.

DETAILED DESCRIPTION OF THE PREFERRED EMBODIMENT

Figure 1:
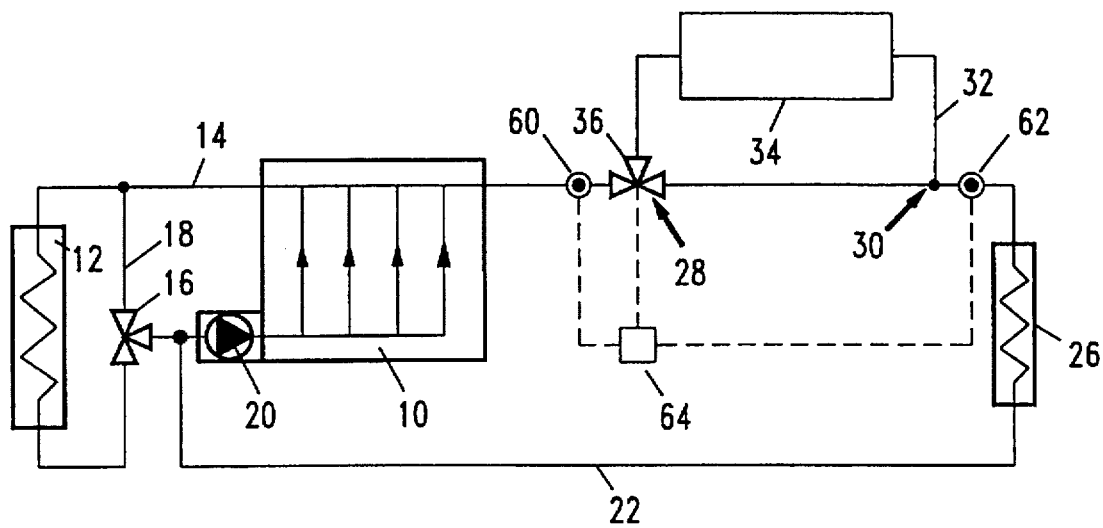
FIG. 1 is a circuit assembly of the cooling fluid circuit of automotive vehicle internal combustion engine including a radiator, a heat exchanger and a heat storage device.

The cooling fluid circuit of an internal combustion engine 10 shown in FIG. 1 includes a first radiator circuit 14 extending through a radiator 12. Circuit 14 can be short circuited by means of a three-way valve 16 and a line 18 to bypass radiator 12 when engine 10 has not reached its operative temperature. A cooling fluid pump 20 driven by engine 10 is arranged to circulate a coolant.

A second heating circuit 22, extends from engine 10 via a heat exchanger 26 and from the latter back to coolant pump 20. A bypass 32 communicates with heating circuit 22 via conduit connections 28 and 30 within which there is disposed a heat storage device 34 for reusable heat. Line connection 28 is comprised of a three-way valve 36 in the embodiment shown in FIG. 1. Three-way valve 36 causes the cooling fluid circuit either to bypass heat storage device 34 or to extend through heat storage device 34. A temperature sensor 60 is disposed in heating circuit 22 upstream of the line connection 28 extending to the inlet of the heat storage device 34. A second temperature sensor 62 is disposed between line connection 30 which communicates the outlet of heat storage device 34 to heating circuit 22 and heat exchanger 26. The two temperature sensors 60 and 62 are connected to a comparator circuit 64 adapted to provide a control pulse which switches three-way valve 36 to a position for fluid flow form line connection 28 to line connection 30 whereby the coolant flow bypasses heat storage device 34 when the temperature sensed by temperature sensors 60 and 62 approximate each other at a predetermined value.

When the three-way valve 36 has been switched by comparator circuit 64 to the position at which the coolant flow bypasses heat storage device 34, the comparator circuit will be deactivated.

As soon as it has been determined that the system has reached its operative temperature, three-way valve 36 will be again switched so as to cause the coolant to flow through heat storage device 34 in order to provide for the latter to be loaded during the operation of engine 10. If operative conditions should now occur at which the two temperature sensors 60 and 62 sense temperatures corresponding to the condition to which comparator circuit 64 responds, this will have no effect because the comparative circuit 64 has been deactivate.

When engine 10 is started, three-way valve 36 is in a position for causing the flow path to extend through heat storage device 34, or it will be moved to this position by a control pulse when engine 10 is being started. The activation of comparator circuit 64 is delayed for a certain time to ensure the occurrence of a temperature difference at the two temperature sensors 60 and 62 thus preventing an immediate response.

To improve the cold start conditions it is advantageous to increase the temperature of engine 10 before engine 10 is started. To this end, an electrical cooling fluid pump 24 is provided in the circuit assemblies described with reference to FIGS. 2 to 7. Pump 24 may be actuated for example when the door-lock of the driver's door of the vehicle is being opened. Initiation of coolant circulation will activate comparator circuit 64, with the above-mentioned time delay being taken into consideration.

Since pump 24 enables coolant circulation without operation of engine 10, the stored heat emitted from engine 10 after the ignition has been switched off may be used to increase the storage temperature. Pump 24 is actuated by switching off the ignition. It had been deactivated prior to switching off the ignition otherwise pump 24 will continue to operate during the time engine 10 is running. In addition, comparator circuit 64 will be activated after the above mentioned delay so as to terminate circulation of coolant when the condition for comparator circuit 64 to respond occurs.

Figure 2:
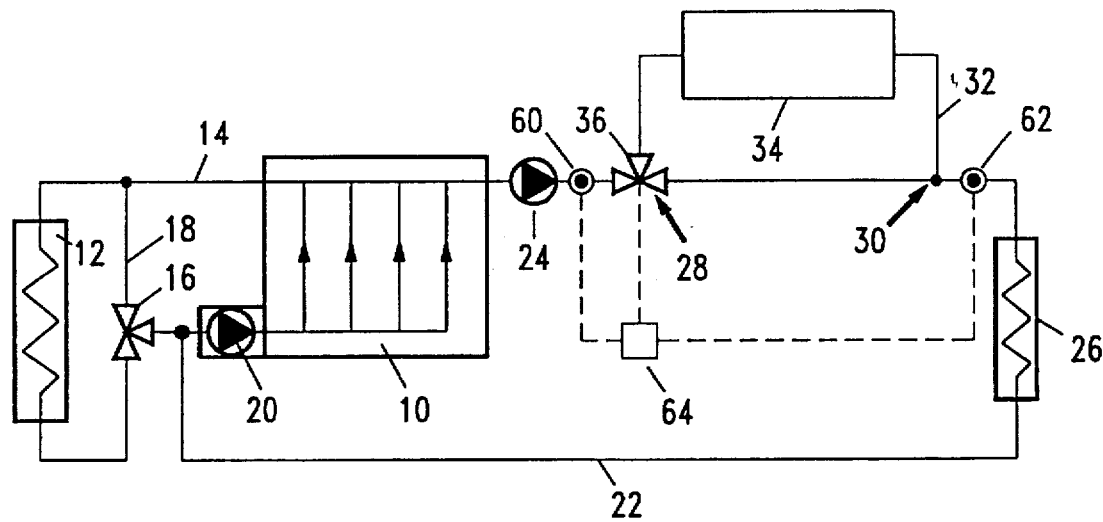
FIG. 2 shows a circuit similar to FIG. 1, however, including an additional electrical cooling fluid pump for the cooling fluid circuit.

In the arrangement of heat storage device 34 shown in FIGS. 1 and 2, the stored heat will be fed initially to heat exchanger 26. The version of FIG. 3 shows an assembly in which bypass 32 including heat storage device 34 communicates with the cooling fluid circuit downstream of heat exchanger 26 so that the hot coolant from heat storage device 34 initially reaches engine 10.

Figure 3:
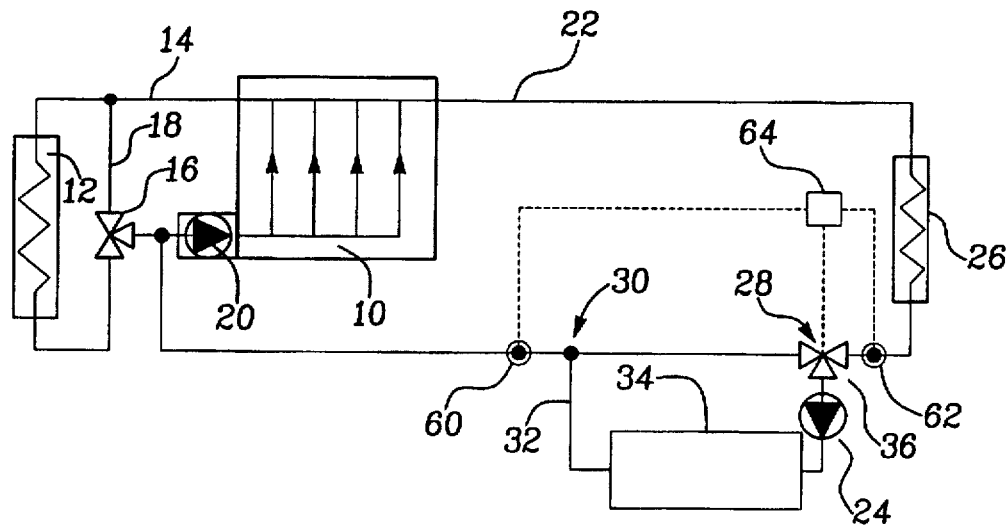
FIG. 3 shows a circuit similar to FIG. 2 wherein the heat storage device is disposed downstream of the heat exchanger.

As shown in FIG. 3, electrical pump 24 may be disposed in bypass 32. This is advantageous insofar as its function is required only when coolant is to flow through heat storage device 34 without operation of the engine. In this arrangement, pump 24 may be controlled by comparator circuit 64 instead of three-way valve 36 with three-way valve 36 being omitted. In this case, a check valve is disposed in the line branch parallel to bypass 32 and a restriction is disposed between heat storage device 34 and line connection 30.

In the embodiments, the coolant is controlled to flow through heat storage device 34 or past heat storage device 34 by three-way valve 36.

In particular, at very low ambient temperatures, it is not feasible to switch coolant flow abruptly from bypassing heat storage device 34 to flowing through heat storage device 34 when the system has reached its operative temperature. This is because coolant exchange during the starting phase has left very cold coolant in heat storage device 34 because it did not yet become heated. This is why the flow rate of coolant through heat storage device 34 would be increased gradually when the system is reaching its operative temperature. Valve 36 is controllable for example in response to the temperature sensed by temperature sensor 62.

The use of one or several cycled valves is feasible, with the flow rate being able to be influenced by change of the opening times and/or the cycle frequency.

Figure 3A:
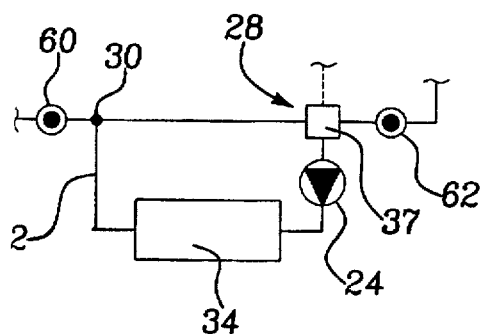
FIG. 3A shows a modified embodiment of FIG. 3.

Instead of being controlled by valves the flow rate of coolant through storage device 34 may be influenced by flow restricting measures 37 as shown in FIG. 3A.

Figure 4:
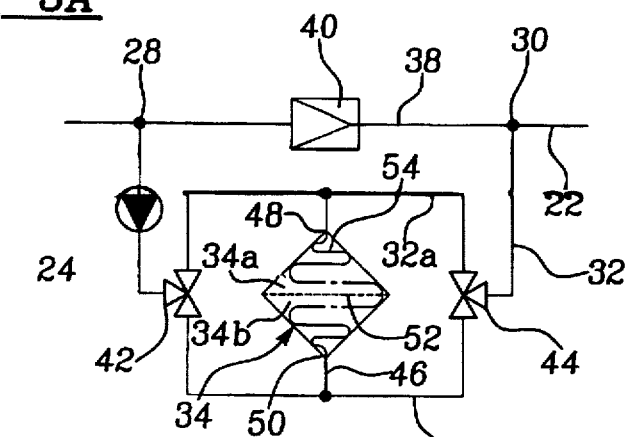
FIG. 4 shows a first embodiment connecting the heat storage device to the cooling fluid circuit of FIG. 2.

FIG. 4 shows a first version for connecting heat storage device 34 to heating circuit 22, with electrical pump 24 being provided in bypass 32 downstream of line connection 28. A check valve 40 is disposed in line 38 which directly communicates with the two line connections 28 and 30. Between pump 24 and line connection 30, bypass 32 includes a pair of three-way valves 42 and 44 between which bypass 32 is divided into a pair of parallel branches 32a and 32b. The two branches 32a and 32b of the bypass communicate with each other by a line 46 including heat storage device 34. The arrangement includes heat storage device 34 having an upper connection 48 which is as high as possible and a lower connection 50 which is as low as possible. Heat storage device 34 is divided between its two connections 48 and 50 into an upper chamber 34a and a lower chamber 34b by at least one horizontal screen 52. The use of horizontal screen 52 or a plurality of horizontal screens enhances the maintenance of horizontal layers between the upper hot coolant and the lower cold coolant when the heat carrier is flowing through heat storage device 34. Thus the exchange of the storage contents occurs without any significant mixing of hot and cold coolants. The mixing of cold and hot coolants in the area of heat storage device 34 may be counteracted—without any limitations on the assembly position—by causing the coolant within heat storage device 34 to flow meander-like in one or a plurality of passages 54 as shown in phantom in FIG. 4.

If it is not intended of the coolant to flow through heat storage device 34, pump 24 is not operated and it provides a flow restriction preventing coolant flow through bypass 32 so that coolant flow occurs through line 38 passed bypass 32.

When heat storage device 34 is to be unloaded, three-way valves 42 and 44 will be switched so that pump 24 communicates with line branch 32b and line branch 32a which in turn communicates with line connection 30. When pump 24 is actuated, cold coolant flows via lower connection 50 into heat storage device 34, and the hot coolant in heat storage device 34 is driven via upper connection 48 towards heat exchanger 26 with check valve 40 preventing back flow from coolant exiting from bypass 32 through line connection 38.

When heat storage device 34 is to be loaded, three-way valves 42 and 44 are switched such that pump 24 now communicates with line branch 32a and line branch 32b communicates with line connection 30. As a result, the hot coolant pumped by pump 24 will flow via upper connection 48 into heat storage device 34 and displace the cooler coolant which flows via lower connection 50.

Figure 5:
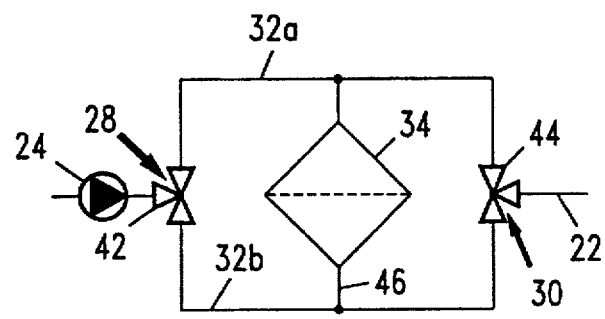
FIG. 5 shows a second embodiment of connecting the heat storage device to the cooling fluid circuit of FIG. 2.

FIG. 5 shows a simplified version wherein three-way valves 42 and 44 are positioned at the location of line connections 28 and 30, respectively. The position of three-way valves 42 and 44 during loading and unloading of heat storage device 34 corresponds to the position explained in connection with respect to FIG. 4. If the coolant is not to flow through storage device 34, valves 42 and 44 will be connected directly to each other, for example through branch 32a.

Figure 6:
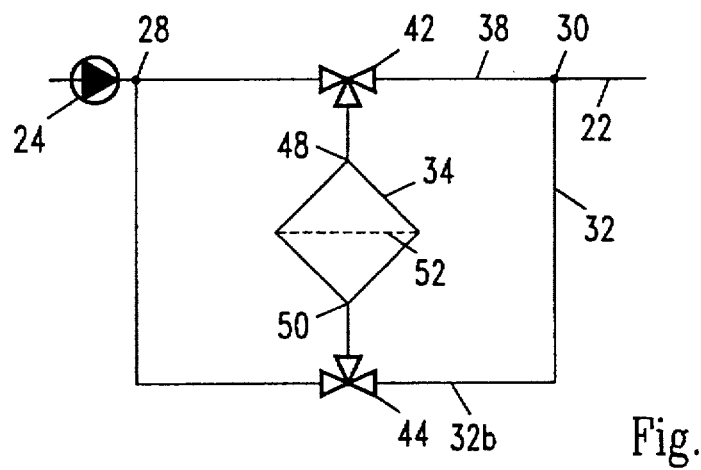
FIG. 6 shows a third embodiment for connecting the heat storage device to the cooling fluid circuit of FIG. 2.

FIG. 6 shows a modification thereof which differs from the embodiment of FIG. 5 substantially by the fact that three-way valves 42 and 44 are not in the position of line connections 28 and 30, but are connected so as to be positioned upstream of two connections 48 and 50 of heat storage device 34. Three-way valve 42 is disposed in line 38 between the two line connections 28 and 30 and it has three positions. When the first position, it directly connects the two line connections 28 and 30 so that coolant flow bypasses heat storage device 34. When in the second position it connects line connection 28 with upper connection 48 of heat storage device 34 with three-way valve 44 being set such that it connects lower connection 50 of heat storage device 34 to line connection 30. In this position heat storage device 34 is loaded by hot coolant.

When in the third position three-way valve 42 connects upper connection 48 of heat storage device 34 to line connection 30, while three-way valve 44 connects lower connection 50 of heat storage device 34 to line connection 28. In this position heat storage device 34 is being unloaded.

Figure 7:
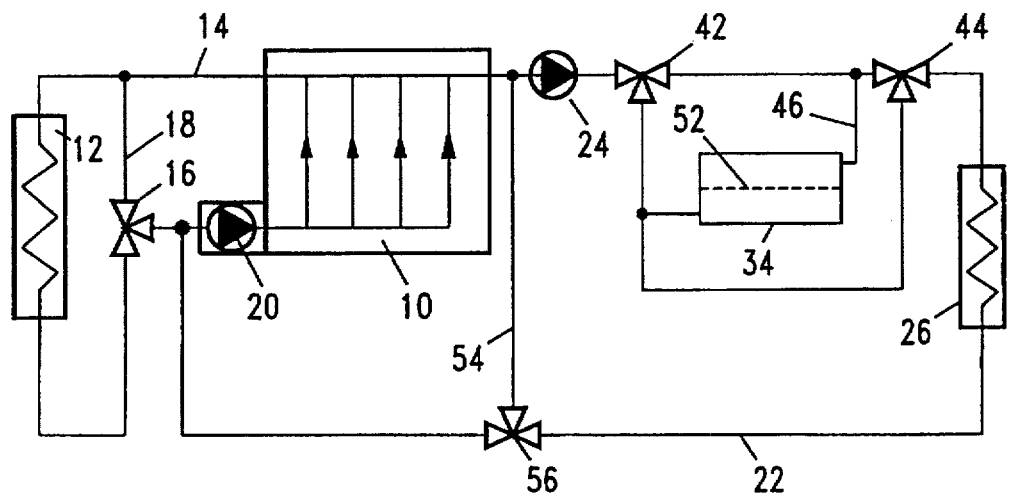
FIG. 7 shows a modification of the cooling fluid circuit of FIGS. 2 and 5 including a short circuit line.

In FIG. 7 the two temperature sensors, the comparator circuit and the associated connecting lines have not been shown of clarity reasons. FIG. 7 shows, corresponding to FIG. 2, the total cooling fluid circuit while using the version of FIG. 5. Contrary to the assembly of FIG. 2 heating circuit 22 includes a short circuit line 54 bypassing engine 10. Short circuit line 54 connects the area downstream of heat exchanger 26 via a three-way valve 56 to the area upstream of electrical pump 24 so that heating circuit 22 may be operated independently of the coolant circuit of the engine.

I claim:

1. A method for operating heat storage devices in particular for reusable heat in automotive vehicles, and in particular for heating an engine at cold start, wherein a coolant circulates in a cooling fluid circuit extending through the engine with the coolant flowing between a heat source and a heat consumer, and a heat storage device having a coolant inlet and outlet being used as a storage medium, said method comprising the steps of:

circulating the coolant, at cold start, through the heat storage device;

terminating the coolant circulation through the heat storage device when a temperature of the coolant at the inlet of the storage device and a temperature of the coolant at the outlet of the storage device have approximated each other at a predetermine value;

resuming circulation of the coolant through the heat storage device when a temperature of the engine or a temperature of the coolant circulating through the engine reaches a first predetermined threshold value; and controlling the coolant flow through the storage device in response to a temperature of the coolant upstream of a junction to the inlet of the storage device such that the rate of flow through the storage device increases in response to an increase in the temperature of the coolant upstream of the junction to the inlet of the storage device.

2. A method according to claim 1, wherein the first predetermined threshold value is about 5° to 10° C. below the temperature of a thermostat setting of the engine cooling system.

3. A method according to claim 1 further comprising the step of ensuring that an average mixing temperature measured downstream from a junction of the outlet of the storage device does not fall below a second predetermined threshold value.

4. A method according to claim 3, wherein the second predetermined threshold value is at least as high as the first predetermined threshold value.

5. A method according to claim 3, wherein said average mixing temperature is controlled in response to a heat demand of a passenger compartment heat exchanger.

6. A method according to claim 1 wherein a cycled control controls the coolant flow through the storage device.

7. A method according to claim 1 wherein flow restricting measures control the coolant flow through the storage device.

8. A heat storage device for performing the method of claim 1, wherein the coolant inlet is disposed at a first position and the coolant outlet is disposed at a second position on the heat storage device, said second position being located above said first position.

9. A heat storage device for performing the method of claim 1, wherein between the inlet and the outlet for the coolant there is disposed at least one screen which is horizontal in the operative position of the heat storage device.

10. A heat storage device for performing the method of claim 1, wherein at least one meander-like flow passage is disposed between the inlet and the outlet for the coolant.

* * * * *

UNITED STATES PATENT AND TRADEMARK OFFICE
CERTIFICATE OF CORRECTION

PATENT NO. : 5,765,511

DATED : June 16, 1998

INVENTOR(S) : Oskar Schatz

It is certified that error appears in the above-identified patent and that said Letters Patent is hereby corrected as shown below:

Title Page, [57] Abstract, line 8, delete "an" and substitute --a-- therefor

Col. 1, line 40, delete "of" and substitute --for-- therefor

Col. 2, line 14, delete "possible.Also" and substitute --possible, and also-- therefor Col. 3, line 9, delete "predetermine" and substitute --predetermined-- therefor Col. 3, line 44, delete "his" and substitute --this-- therefor Col. 3, line 60, delete "of" and substitute --or-- therefor Col. 4, line 17, delete "predetermine" and substitute --predetermined--

Col. 4, line 51, delete "preformed" and substitute --performed-- therefor

Col. 5, line 30, delete "electrically" and substitute --electrical-- therefor

Col. 5, line 48, "modified embodiment of FIG. 3" should be --portion of the circuit of FIG. 3 with a flow restricting measure replacing the valve--

Col. 6, line 18, delete "form" and substitute --from-- therefor

Col. 6, line 36, delete "deactivate" and substitute --deactivated-- therefor

UNITED STATES PATENT AND TRADEMARK OFFICE
CERTIFICATE OF CORRECTION

PATENT NO. : 5,765,511

DATED : June 16, 1998

INVENTOR(S) : Oskar Schatz

It is certified that error appears in the above-identified patent and that said Letters Patent is hereby corrected as shown below:

Col. 7, line 67, delete "passed" and substitute --past-- therefor

Col. 8, line 34, after "when" insert --in--

Col. 8, line 49, delete "of" and substitute --for-- therefor

Col. 9, line 5, claim 1, delete "predetermine" and substitute --predetermined-- therefor Signed and Sealed this Twenty-second Day of December, 1998

Attest:

BRUCE LEHMAN

Attesting Officer

Commissioner of Patents and Trademarks